J. J. MORGAN AND L. H. BACKER.
SUPPORTING CLAMP FOR BURETTES, OTHER TUBES AND RODS.
APPLICATION FILED JAN. 18, 1918.
1,318,899. Patented Oct. 14, 1919.
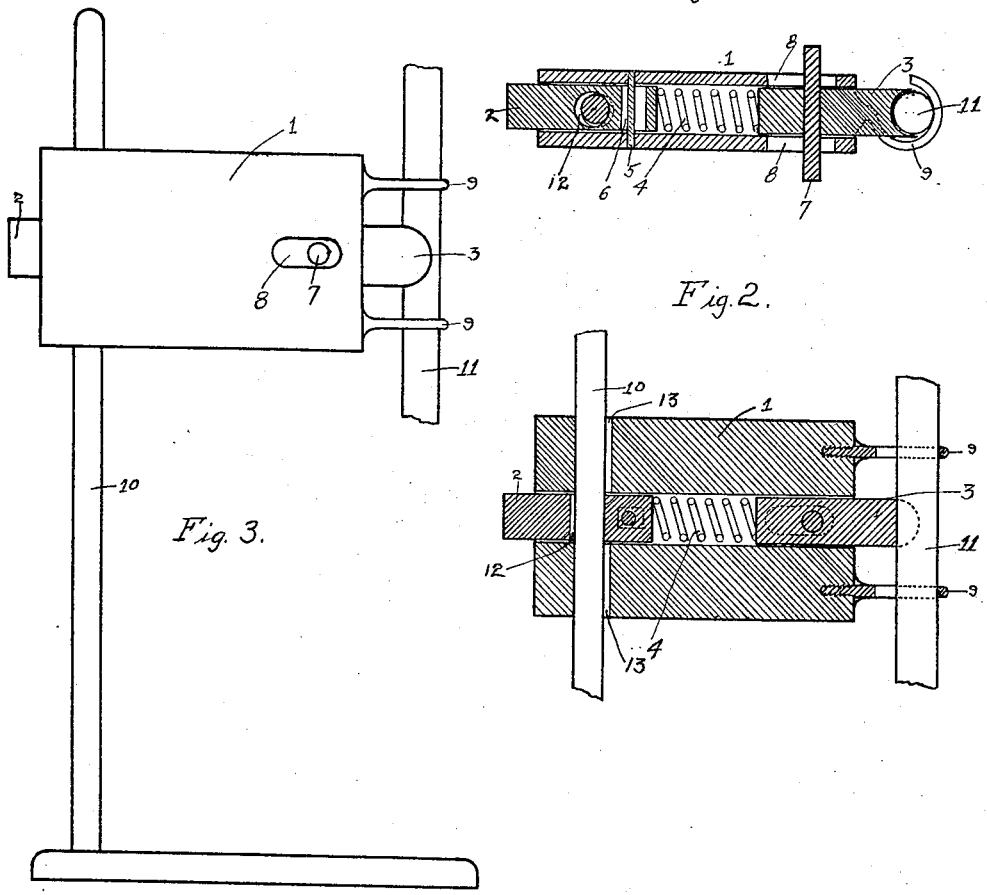

UNITED STATES PATENT OFFICE.

JEROME JOHN MORGAN, OF MAPLEWOOD, AND LESLIE HERR BACKER, OF MOUNTAIN LAKES, NEW JERSEY.

SUPPORTING-CLAMP FOR BURETTES, OTHER TUBES, AND RODS.

1,318,899.          Specification of Letters Patent.        Patented Oct. 14, 1919.

Application filed January 18, 1918. Serial No. 212,531.

*To all whom it may concern:*

Be it known that we, JEROME JOHN MORGAN and LESLIE HERR BACKER, citizens of the United States, residing at Maplewood, in the county of Essex and State of New Jersey, and at Mountain Lakes, in the county of Morris and State of New Jersey, respectively, have invented a new and useful Supporting-Clamp for Burettes, other Tubes, and Rods, of which the following is a specification.

Our invention relates to improvements in the manner of supporting burettes, other tubes and rods, whereby the supporting clamp is held in position upon the rod of a support and holds the burette, other tube or rod in position in the supporting clamp by pressure from a spring, springs or elastic material, and without the use of a screw or screws.

We attain this object by the mechanism illustrated in the accompanying drawing, in which—

Figure 1 is a horizontal section through the center of the supporting clamp; Fig. 2, a vertical section through the center of the supporting clamp; and Fig. 3, a view of the supporting clamp mounted in position upon a support and holding in position a burette, other tube or rod.

Similar numerals refer to similar parts throughout the several views.

The supporting plunger 2, the clamping plunger 3 and the spring 4 are placed in a hole or holes bored in the block 1 in such a manner that they are free to move within certain limits as hereinafter described. The block and the plungers may be made of any suitable material.

The motion of the supporting plunger 2 is limited by a slot 6 in the supporting plunger 2 and a pin 5 fixed in the block 1.

The motion of the clamping plunger 3 is limited by slots 8 8 in the block 1 and a pin 7 fixed in the clamping plunger 3.

The spring 4 is confined in the hole in the block 1 by the supporting plunger 2 and the clamping plunger 3 and is free to exert its pressure upon both plungers.

The rod 10 of a support passes through a hole 13 13 in the block 1, and a hole 12 in the supporting plunger 2, in such a manner that the pressure of the spring 4 forces the supporting plunger 2 against the rod 10 and causes friction between the surface of the rod 10 and the surfaces of the hole 13 13 in the block 1 and of the hole 12 in the supporting plunger 2; which friction holds the supporting clamp in position on the rod 10.

The burette, other tube or rod 11 is held in position in the hooks 9 9 set in the block 1, by pressure of the spring 4 which forces the clamping plunger 3 against the burette, other tube or rod, 11.

We are aware that prior to our invention burettes, other tubes and rods have been supported by the pressure of a spring or springs; which spring or springs was either fastened rigidly to a wall, bench, or rod of a support, or was held in position on the wall, bench or rod of a support by means of a screw or screws. We therefore do not claim such use of a spring or springs; but

We claim:

1. The combination whereby the supporting clamp is held in position upon the rod of a support and at the same time holds a burette, other tube or rod in position in the supporting clamp by means of pressure from a single spring, which spring is confined to a hole in the block or body of the supporting clamp by two movable plungers, and is free to exert its pressure upon both plungers essentially as shown and described.

2. A supporting clamp whose position upon the rod of a support can be changed both vertically and horizontally by pressure upon a plunger, and whose position becomes fixed in any position upon the rod of the support immediately upon removal of the pressure upon said plunger.

JEROME JOHN MORGAN.
LESLIE HERR BACKER.

Witness:
F. W. WEBER.

Copies of this patent may be obtained for five cents each, by addressing the "Commissioner of Patents, Washington, D. C."